United States Patent
Gentry et al.

[15] 3,668,910
[45] June 13, 1972

[54] EXTRUSION HANDLING APPARATUS

[72] Inventors: Charles B. Gentry; Robert M. Scanlon, both of Grand Rapids; Jerome Rumery, Jenison; Howard L. McDonald, Grand Rapids; Larry G. Keeler, Hudsonville, all of Mich.

[73] Assignee: Granco Equipment, Inc., Grand Rapids, Mich.

[22] Filed: Oct. 6, 1970

[21] Appl. No.: 78,362

[52] U.S. Cl. ..................................................72/24, 72/255
[51] Int. Cl. ......................................B21j 7/26, B21c 23/00
[58] Field of Search ....................72/254, 255, 256, 257, 24

[56] References Cited

UNITED STATES PATENTS

| | | | |
|---|---|---|---|
| 2,925,909 | 2/1960 | Worlidge | 72/257 |
| 3,475,941 | 11/1969 | Groos | 72/257 |
| 2,914,170 | 11/1959 | Kent | 72/257 |
| 2,379,622 | 7/1945 | Butler | 72/255 |

*Primary Examiner*—Charles W. Lanham
*Assistant Examiner*—R. M. Rogers
*Attorney*—John E. McGarry

[57] ABSTRACT

An extrusion handling apparatus which grips the end of extruded products and stretches them as they are extruded from a die of an extrusion machine. The apparatus includes a clamping means for gripping the extruded products, the clamping means being mounted on rails to move linearly away from the extrusion die. Supports for the extruded products are mounted independently of the clamping means and synchronized to move with the clamping means beneath the extruded products and are vertically adjustable with respect to the clamping means to adjust the supports for different size extrusions. The clamping means have opposite jaws which close on the center line of the extruded products. The jaws are moved by a pneumatic, or other, fluid pressure system which is carried by a cart which supports the clamping means. The pneumatic pressure system is recharged by docking with a pressure source at one end of the travel of the clamping jaw cart. A shear press is mounted on a track for movement independent of the clamping means and has power means operably connected thereto for movement of the shear press away from the clamping means after cutting of the extrusion to permit gripping of the cut end of the extrusion without interference from the shear press.

15 Claims, 9 Drawing Figures

INVENTOR.
CHARLES B. GENTRY
ROBERT M. SCANLON
JEROME RUMERY
HOWARD L. McDONALD
LARRY G. KEELER
BY John E. McGarry

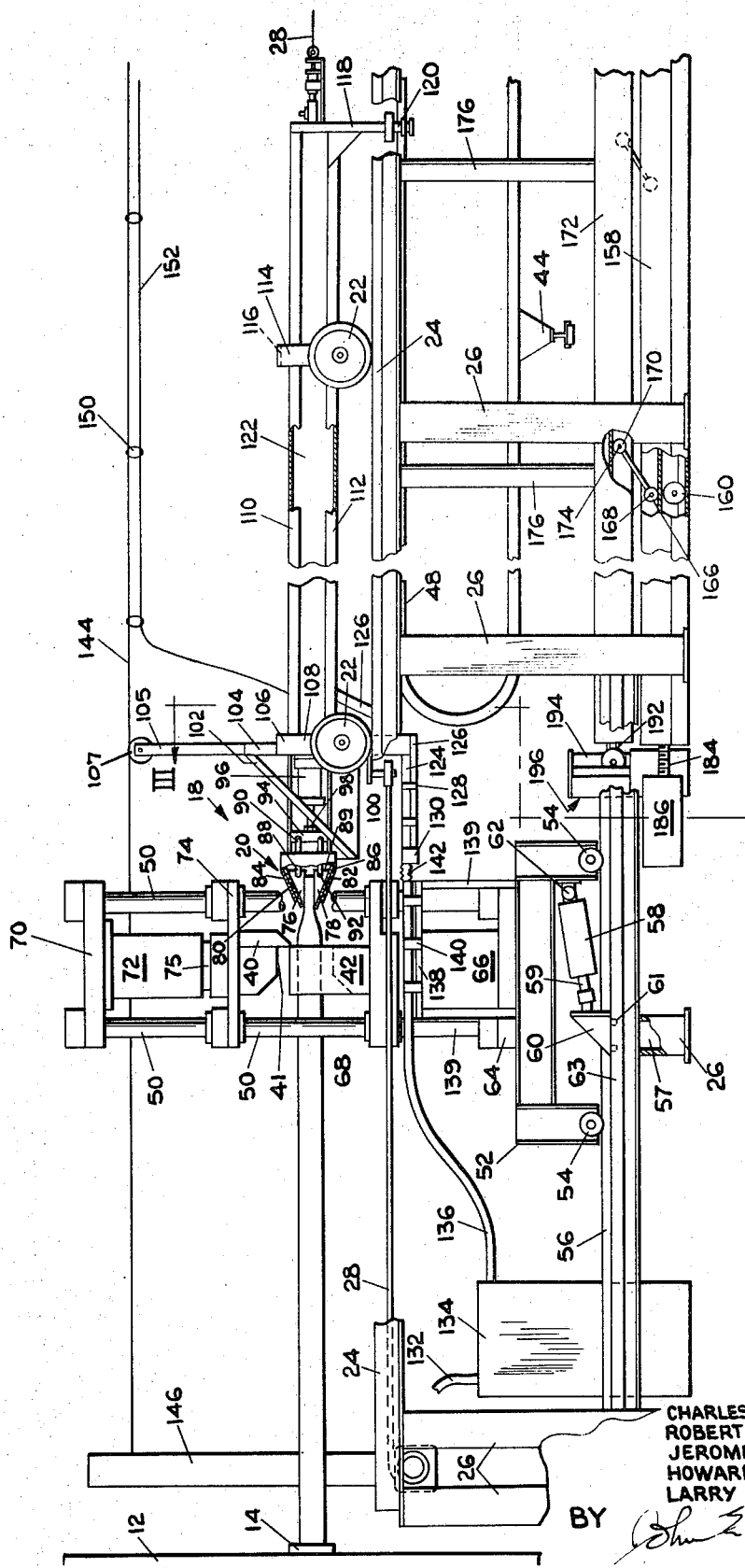

INVENTOR.
CHARLES B. GENTRY
ROBERT M. SCANLON
JEROME RUMERY
HOWARD L. McDONALD
LARRY G. KEELER
BY John E. McGary INVENTOR.
CHARLES B. GENTRY
ROBERT M. SCANLON
JEROME RUMERY
HOWARD L. McDONALD
LARRY G. KEELER
BY John E. McGarry INVENTOR.
CHARLES B. GENTRY
ROBERT M. SCANLON
JEROME RUMERY
HOWARD L. McDONALD
LARRY G. KEELER
BY John E. McGarry

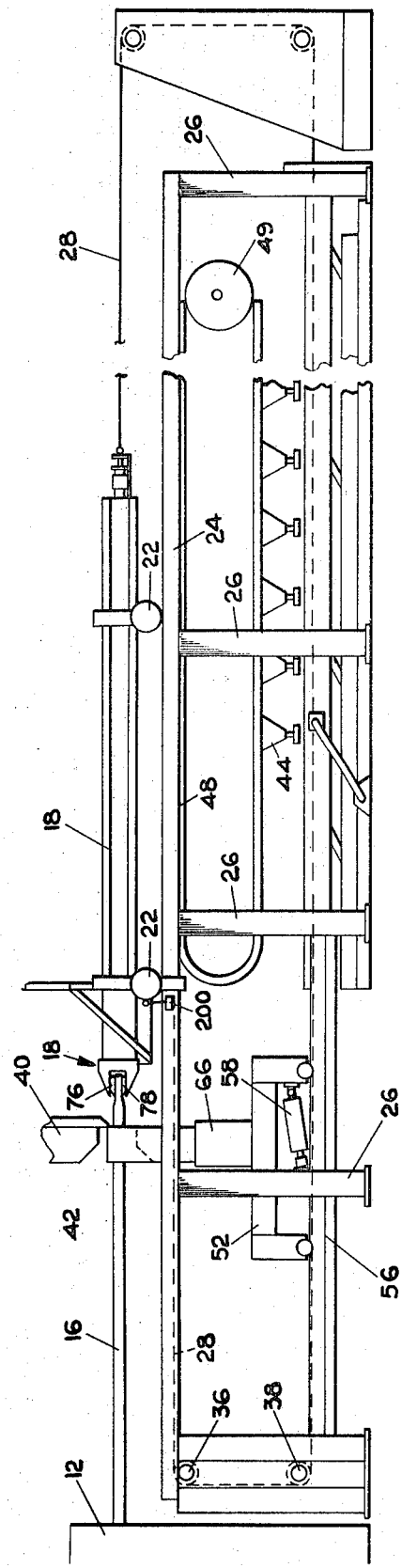
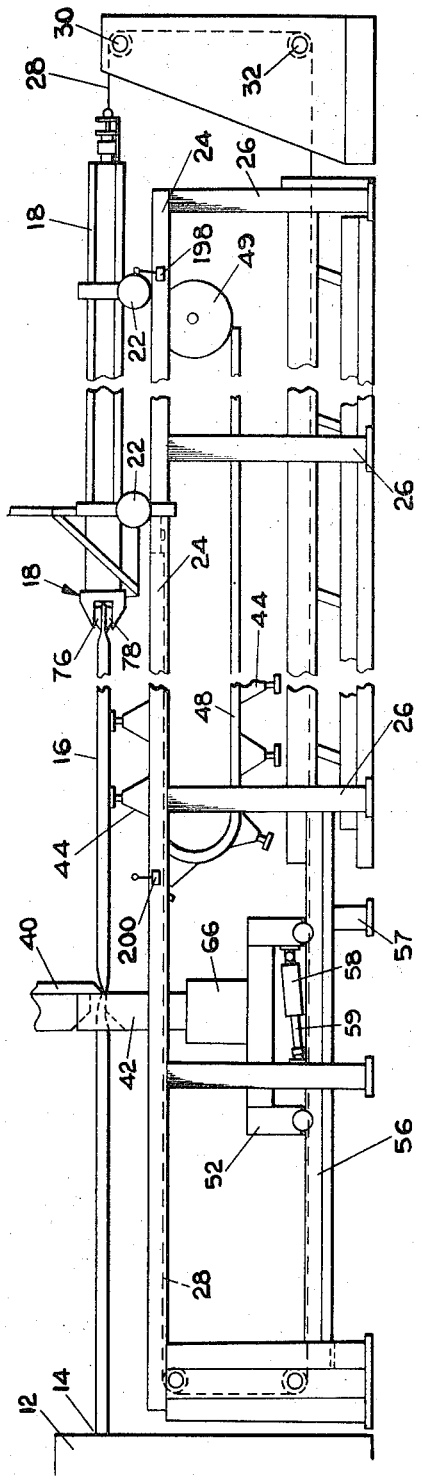

EXTRUSION HANDLING APPARATUS

This invention relates to extrusion handling apparatus. In one of its aspects, the invention relates to an apparatus for stretching metal extrusions as they are extruded from an extrusion die.

Metal extrusions are made by expressing a heated metal block through a die opening having the cross sectional shape of the desired products. Aluminum is most commonly extruded, although other metals, such as magnesium, can also be extruded.

Instead of following a straight line, the extruded products tend to curve during the extrusion process because of unbalanced frictional forces of the die on the metal and other factors. Conventionally, the extrusions are cut to length and moved onto a cooling or runout table. When the extrusions have cooled, they are stretched to about 5 percent by gripping either end and pulling in opposite directions until the desired degree of elongation is achieved. This stretching straightens the curved extrusions.

The stretching operation must be carried out on almost every extrusion; usually at a relatively slow rate and with the aid of two skilled workers. When multiple dies are used, multiple parts are simultaneously extruded. Because of the inherent slowness of the stretching operation, the stretching operation falls behind the extrusion operation, causing the unstretched extrusions to pile up on the runout table. The expensive extrusion operation must then be shut down so that the backlog of extrusions can be stretched.

It has been proposed to stretch the extrusion products as they eminate from the dies in order to avoid the slow and expensive separate stretching operation. One machine built for this purpose employed an overhead trolley for the extrusion puller. This machine lacked sufficient power to properly stretch the extrusions and did not otherwise operate satisfactorily.

Another such machine is disclosed by Kent in U.S. Pat. No. 2,914,170. This machine employs clamping jaws which ride on a centrally disposed rail and has stationary extrusion supports which rise beneath the extrusions as the pulling head passes along the track. Since the extrusion supports are stationary with respect to the extrusions, the hot extrusions tend to become marred or scratched as they are drawn over the supports.

Still another such machine is disclosed by Worlidge in U.S. Pat. No. 2,925,909. This machine employs clamping jaws and a special flexible link conveyor support for the extrusions, which support moves beneath the extrusions as the extrusions are drawn by the clamping jaws. In this machine, the slat supports must be set at a given height with respect to the center line of the extrusion device and the clamping jaws. The support is not adapted for extrusions which differ in thicknesses.

In addition, the parking of the slats in nested position provides a fixed support over which the extrusions are dragged near the extrusion press, thereby diminishing somewhat the value of the moving conveyor.

Pieron et al, in U.S. Pat. No. 3,116,832 discloses still another extrusion pulling apparatus. This machine uses the overhead trolley support for the extrusion gripping element, and has the same limitations as the other overhead trolley machine discussed above. Still further, this machine uses as a gripping element a single jaw which is forced downwardly on the work against the fixed surface. The jaws are not capable of the same pressures which are obtained from conventional gripping jaws, which are wedged together and do not lend themselves to extrusions of different thicknesses. The two element gripping jaws which close on the center line on diverging guides have been found to be most satisfactory in gripping extrusions of varying thicknesses.

In addition to the foregoing requirements which have not been met by the prior machines, it is desirable to provide a shear press to operate in conjunction with an extrusion pulling machine to permit the gripping elements to clamp the cut end of the extrusion, and to cut the extrusion at different lengths, spaced from the extrusion die to minimize scrap. If the shear press is movable with respect to the die, then the pulling machine must be able to grip the cut portion at different distances spaced from the extrusion die.

By various aspects of the invention one or more of the following, or other objects can be obtained.

It is an object of this invention to provide an extrusion pulling machine which is capable of exerting varying amounts of tension on extruded products as they are being pulled from an extrusion die.

It is another object of this invention to provide an extrusion pulling mechanism and movable shear press wherein the pulling mechanism can clamp onto the cut end of extruded products at different distances spaced from the extrusion press.

It is another object of the invention to provide an extrusion pulling machine having an extrusion support mechanism which moves with the extrusions to eliminate scratching of the hot extruded products, and which is vertically adjustable to support products of different height dimensions.

It is yet another object of this invention to provide an extrusion pulling machine having a pair of jaws which close on the center line of the extrusion press, and which jaws are movable toward and away from the center line of the extrusion press to facilitate gripping and pulling of the extruded products.

It is still another object of this invention to provide an extrusion pulling machine having a pair of penumatically actuated jaws which eliminate the necessity of pneumatic pressure hoses traveling along the path of movement of the jaws.

It is still further object of this invention to provide an extrusion pulling mechanism which operates in conjunction with a shear press to grip the cut end of the extrusion without interference from the shear press.

It is yet another object of this invention to provide an extrusion pulling mechanism having means to clamp single and/or multiple extrusions with substantial pressures while exerting a controlled pulling force on the extrusion as it is extruded from the die.

Other aspects, objects and the several advantages of this invention are apparent to one skilled in the art from a study of this disclosure, the drawings, and the appended claims.

According to the invention, there is provided an extrusion handling apparatus having clamping means for engaging extruded products and means mounting the clamping means for movement between spaced points along the line, toward and away from an extrusion press. Power means are provided to move the clamping means between the points along the line, the power means including means to move the mounting means in at least one direction by applying a constant force thereto to pull extruded products from the extrusion press at a constant tension. Support means, moveable along the line of movement of the mounting means, are provided for supporting the extruded products as they are pulled by the clamping means from the extrusion press, the support means being synchronized for movement with the clamping means. Means are provided for adjusting the height of the support means independent of the clamping means so as to accomodate extruded products of different dimensions with respect to the center line of the die.

In accordance with another aspect of the invention, means are provided for actuating the opening and closing of the clamping means, the actuating means including a fluid pressure actuation system carried by the clamping means mount and means for recharging the fluid pressure system at at least one point along the line of movement of the mounting means.

In accordance with still another embodiment of the invention, a shear press is provided on a movable mounting independent of the clamping means and power means are provided to move the shear press away from the clamping means at selected time intervals to permit gripping of the cut ends of the extruded products by the clamping means without interference from the shear press.

The invention will now be described with reference to the accompanying drawings in which:

FIG. 2 is a detailed side elevational view of a portion of the puller mechanism and shear press shown in FIG. 1;

FIG. 7 is a schematic illustration of the puller mechanism and shear press assembly illustrating a step in the operation of the apparatus;

FIG. 8 is a schematic illustration of the assembly similar to FIG. 7 but showing a later step in the operation of the assembly;

Figure 1:
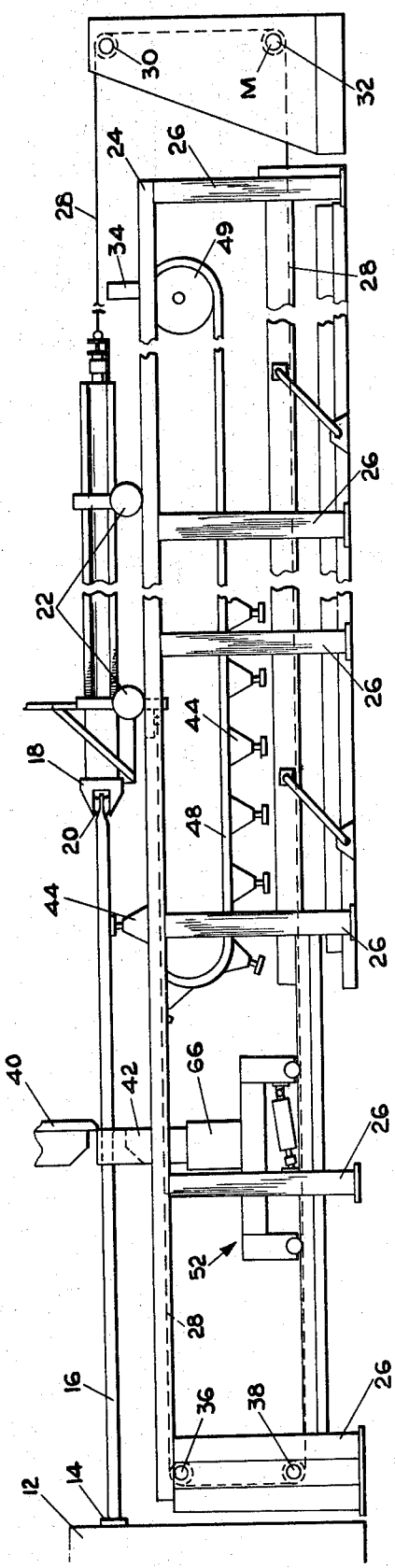
FIG. 1 is a schematic illustration of a puller mechanism, and shear press assembly according to the invention.

Referring now to the drawings, and to FIG. 1 in particular, there is shown an extrusion machine 12 having a die opening 14 from which an elongated extrusion product 16 is extruded. A pulling head 18 having gripper teeth 20 clamps the end of the extrusion product so as to maintain the product straight as it is extruded. The pulling head 18 is mounted on a carrier for movement on wheels 22 which ride on rails 24. Upright support members 26 support the rails 24. Cables 28 are fixed to either side of the back end of the pulling head 18 and pass around rollers 30 and 32 at the back end of the assembly, and around rollers 36 and 38 at the front end of the assembly. The other ends of the cable are fixed to the sides of the front end of the pulling head 18. The power to move the pulling head is supplied by a motor (not shown) which is coupled to roller 32. Thus, the cable 28 is driven by roller 32.

A backstop member 34 is provided at the back end of the rail 24 to limit the movement of the pulling head 18.

The extruded product 16 passes through an opening between a shear blade 40 and a shear block 42 which operate to sever the extruded product at selected intervals.

The pulling head 18 is fixed to a moving extrusion supporting slat conveyor comprising supporting slats 44 and a fixed guide track 48. As the pulling head moves to the right as illustrated in FIG. 1, the supporting slats 44 in the guide track 48 move up beneath the extruded product 16 near the shear press and, then move along with the products 16 at the same speed to support the extruded product as it is being pulled away from the extrusion machine.

Figure 3:
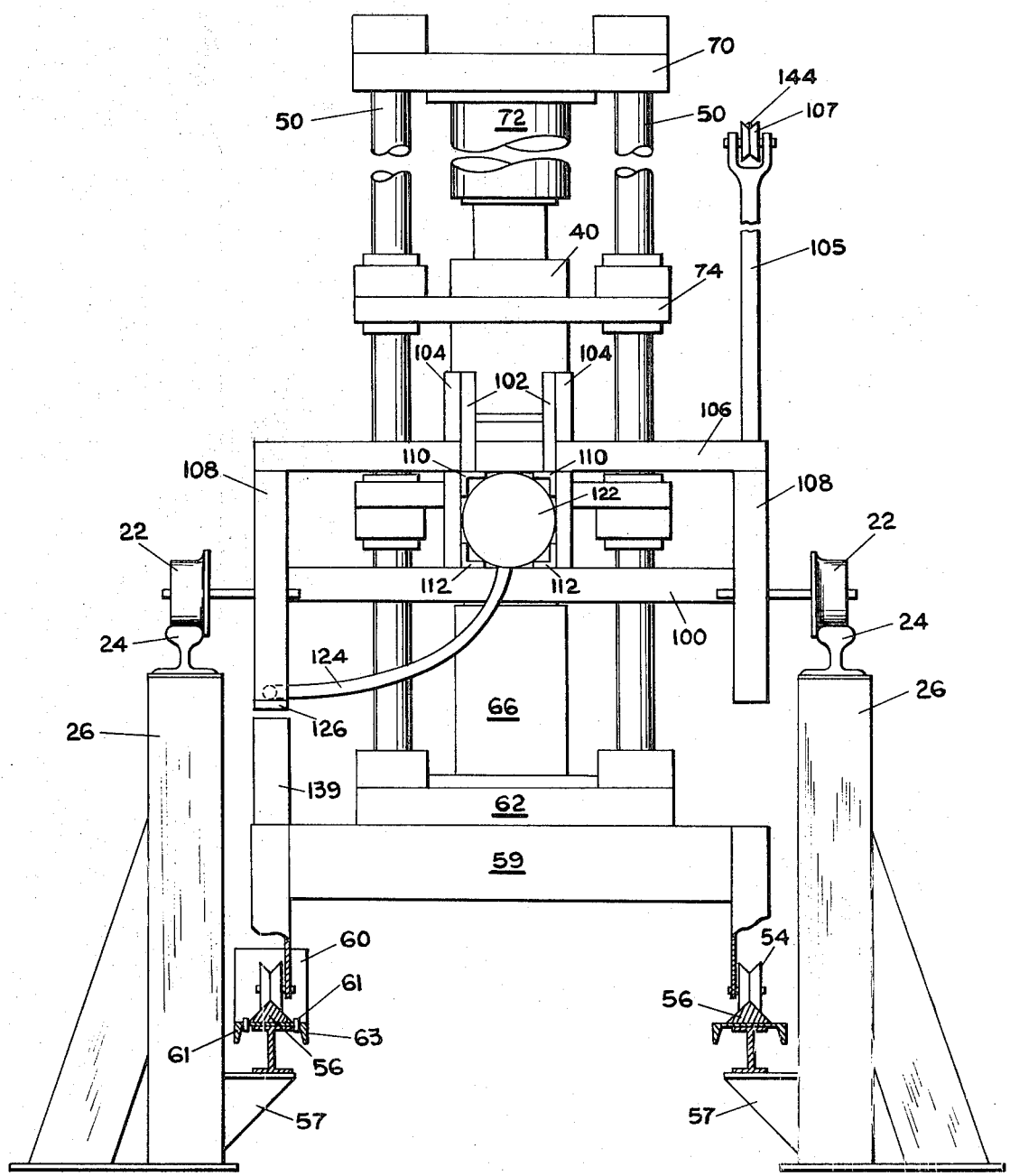
FIG. 3 is a cross sectional view through lines III—III of FIG. 2.

Reference is now made to FIGS. 2 and 3 for a more detailed discussion of the apparatus schematically illustrated in FIG. 1. The shear mechanism 4 comprises vertical rods 50 which are fixed at the bottom thereof to a cart 52 having wheels 54. Rails 56, on supports 57, provide a track for the wheels 54 of cart 52. A cylinder 58 has a piston rod 59 which is secured to an adjustable stop 60. The other end of the cylinder 58 is secured to the cart 52 through a pivotable connection 62. The adjustable stop 60 has a pair of depending pins 61 through which it engages holes in a track support 63. Thus, the stop 60 is adjustable to move the shear press towards or away from the extrusion press.

A base plate 64 is supported on cart 52 and secures the bottom of each of the upright rods 50. A guide plate 68 is secured to the shear block 42 and is slidably retained by the upright rods 50. A hydraulic cylinder 66 is supported by base plate 64 and has a piston rod which supports the shear block 42. The shear block 42 can be thus raised or lowered by the cylinder 66, and the movement of the shear block 42 is guided by plates 68 and rods 50.

A top plate 70 is secured to the top of each of the rods 50 and suspends a shear blade cylinder 72. The shear blade 40 is secured to a guide plate 74 which in turn is slidably retained by the rods 50. The cylinder 72 has a piston rod 75 which is joined to the guide plate 74. The cylinder 72 actuates the upward and downward movement of the shear blade 40 with the guide plate 74 sliding on the rods 50. An upper shear block is positioned adjacent the shear blade 40 and above the shear block 42. As the shear block 40 passes along side shear block 42 to shear the extrusion, the upper shear block 41 is brought down a predetermined distance above the shear block 42. By such action, the leading edge of the extrusion after cutting will be crushed to a height which can be more easily accepted by the jaws 20 of the pulling head.

The pulling head 18 comprises an upper jaw 76 and a lower jaw 78. The upper jaw 76 is secured to an inclined plate 80 and the lower jaw 78 is secured to an inclined plate 82. The jaws have a fixed frame which guides the movement of the gripper jaws forward and away from the center line of the extrusion press. This frame comprises an upper guide plate 84 and a lower guide plate 86. Other means (not shown) maintain the inclined plates 80 and 82 in contact with the guide plates 84 and 86 respectively. The upper jaw 76 is pivotably secured to one end of a link 90. The other end of the link 90 is pivotably secured to a plate 94. The lower jaw 78 is pivotably secured to one end of a link 92. The other end of link 92 is pivotably secured to plate 94. A piston cylinder 96 is mounted on the pulling head 18 and has a piston rod 98 which is secured to the plate 94.

The cylinder 96 actuates the opening and closing jaws 76 and 78 by the reciprocatory movement of the piston rod 98. In FIG. 2 the jaws are shown in the closed position. When the piston rod 98 is retracted by cylinder 96, the plate 94 moves to the right in the illustration of FIG. 2 so that the jaws 76 and 78 are pulled to the right by the links 90 and 92. By such movement, the jaws are opened.

The pulling head carrier assembly is formed from a plurality of L-shaped supports 110 and 112 which are secured together at the front of the pulling head through cross members 106 and vertical members 109. These L-shaped supports 110 and 112 are secured to a rear portion by upright vertical members 114 and horizontal members 116. The pressure cylinder 96 and gripper teeth assembly 20 are supported by a forward support beam 100 and inclined braces 102 which are fixed at their upper ends to vertical uprights 104. The top cross member 106 secures the vertical uprights 104. A depending bar 118 is secured to the L-shaped support members 110 and 112 at each side of the rear of the pulling head carrier. A fastening member 120 on the bottom of each of the depending bars 118 is provided to engage the moveable links of the slat conveyor. Such fastening members can include a plate on the bottom of bar 118, which plate is welded to a link in the conveyor chain.

A storage tank 122 is supported by the L-shaped supports 110 and 112. The pressure in the storage tank is used to actuate the cylinder 96 through a solenoid valve, (not shown).

Reference is now made to the FIGS. 2 and 3 for a description of the means for supplying the fluid pressure to the tank 122. A fluid pressure line 124 extends downwardly from and to one side of the storage tank 122. The fluid pressure line 124 extends forwardly above the vertical members 109 and terminates in a female fitting 130 containing a check valve (not shown). The pressure line 124 is supported by a rigid support member 126 which is fixed at one end to the bottom of one of the vertical members 109. Straps 128 secure the pressure line 124 to the horizontal support 126.

The fluid pressure such as compressed air, is supplied from a source (not shown) through line 132 to a surge tank 134. The fluid pressure therein is then passed through a pressure line 136 and to a male fitting member 142 which is equipped with a check valve. The pressure line 136 is fixed in its upper position by a horizontal support 138 having straps 140. The horizontal support 138 is secured to uprights 139 which in turn are rigidly supported by the cart 52. Thus, the end of the pressure line 136 containing the fitting member 142 moves with the shear press and cart 52.

The valve in the fitting member 142 can be any suitable valve which operates to pass fluid pressure such as air from line 136 to line 134 when the fitting members 142 and 130 are joined together, and which operates to terminate the flow through the fitting member 142 when the members 142 and 130 are separated. Such valves are commonly used on air hoses for tire pumps in gasoline stations and the like.

Figure 4:
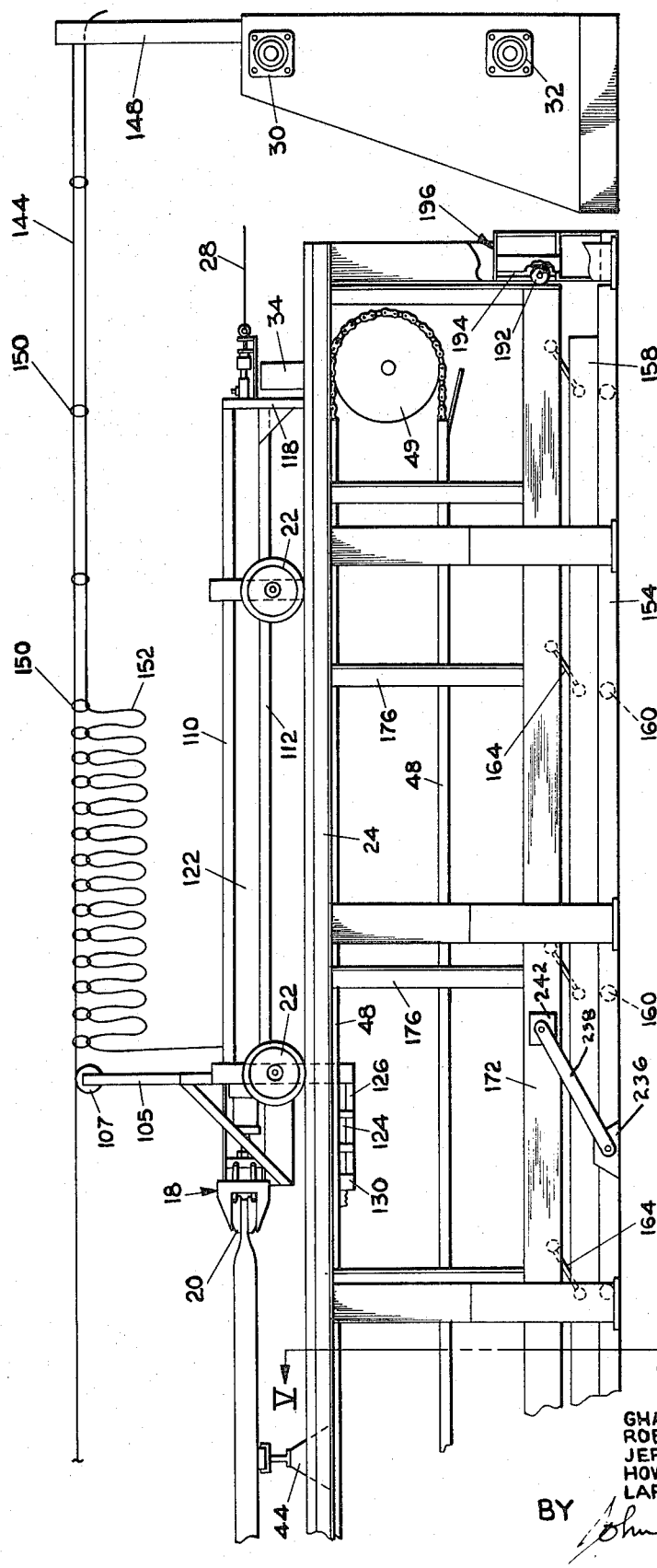
FIG. 4 is a detailed side elevational view of the end of the puller mechanism remote from the shear press showing the puller mechanism at the end of the track remote from the shear press.

A taut wire 144 is supported at one end on a support member 146 and at the other end by support member 148 (FIG. 4). The support 146 is secured to the supports 26 at the front end of the assembly and the support 148 is secured to the supports 26 at the other end of the assembly. In addition, a mast 105 extends upwardly from the frame of the pulling head and has a roller 107 which is in contact with the wire 144. This mast and roller arrangement provides additional support for the taut wire 144 in a central portion as the pulling head operates. A plurality of rings 150 are strung on the taut wire 144 and these rings support an electrical wire 152. One end of the electrical wire is connected to the jaw operating solenoid valve (not shown) and the other end of the electrical wire is joined to a control center (not shown) for operating the solenoid valve.

Figure 5:
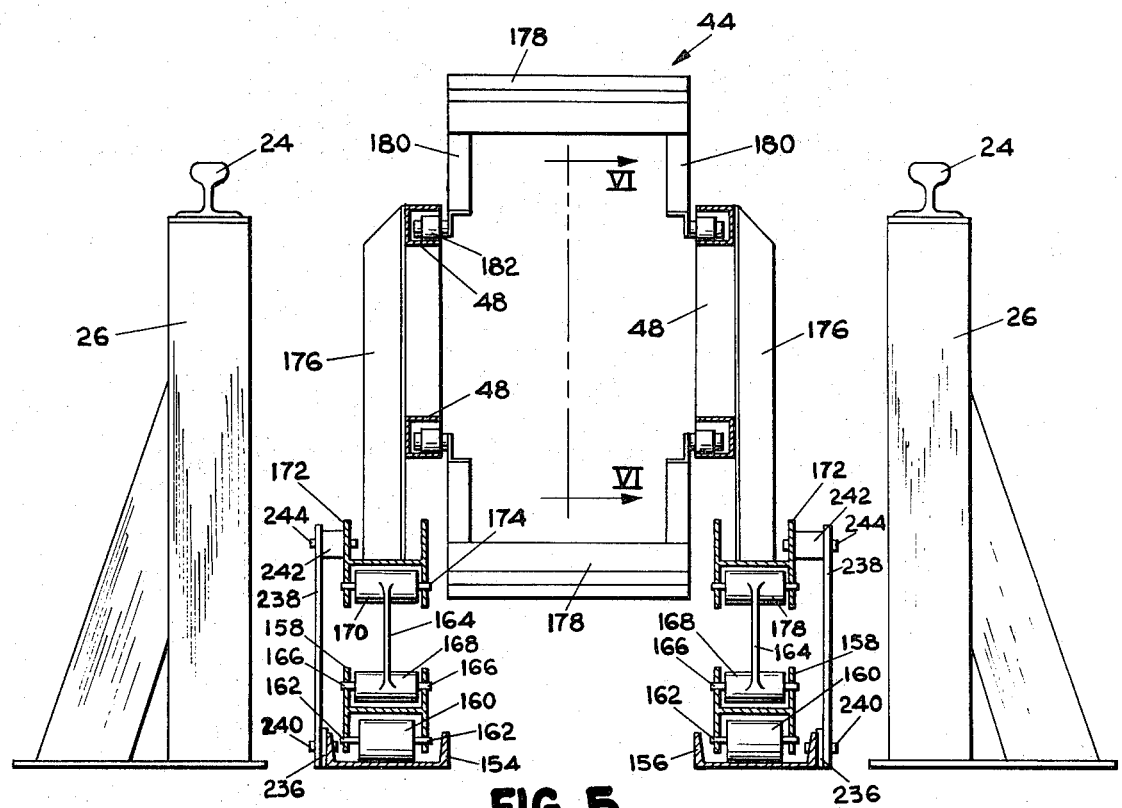
FIG. 5 is a cross sectional view through lines V—V of FIG. 4.

Reference is now made to the FIGS. 2, 4 and 5 for a description of the mechanism for raising and lowering the moving slat conveyor. A pair of longitudinal channel tracks 154 and 156 extend from the shear press to the opposite end of the assembly remote from the press. An I beam 158 is supported in each of the channel tracks 154 and 156 through rollers 160 having axles 162 which extend through the bottom of the I beams. Connector links 164 are pivotably secured at a bottom rounded end 168 through axles 166 to the top of the I beams 158. The connector links 164 are pivotably secured at upper rounded ends 170 through axles 174 to upper I beams 172. Upright supports 175 are joined at the bottom to the upper I beams 172. The track 48, which is formed from inwardly directed U-shaped member, is secured at upper and lower portions to the upright supports 176. A screw jack 186 is fixed at the forward end of each lower I beam 158. The screw jack 186 has a screw 184 which is joined at its outer end to the lower I beam 158. The screw jacks are operated by conventional means (not shown) such as a gear motor, sprocket and chain, bearings and couplings. Each of the upper I beams 172 has a roller 192 attached at either end. A track guide 194 in a support housing 196 receives roller 192 and defines vertical movement of the I beams 172.

As the screw 184 is extended by the screw jack 186, the lower I beam 158 is moved to the right, thereby forcing the upper I beam 172 upwardly, guided by the roller 192 in the vertical track guide. This upward movement of the upper I beam 172 raises the entire supporting slat structure so that the conveyor slat mechanism can be vertically adjusted for extrusions of different heights.

A plurality of linkages 238 are spaced along the slat conveyor support between the channel tracks 154, 156 and the upper I beams 172. The lower portion of each linkage 238 is rotatably joined by pin 240 to plate 236 which is welded to the outside of the channel tracks 154 and 156. The upper end of linkage 238 is rotatably mounted on upper I beam 172 through a pin 244 and a plate 242 which is attached to the I beam 172. The linkages transmit the horizontal component of forces exerted by I beam 172 to the channel tracks 154 and 156. This reduces the need for massive supports on the rear guide track 144 and permits the use of a low load bearing roller 192.

Figure 6:
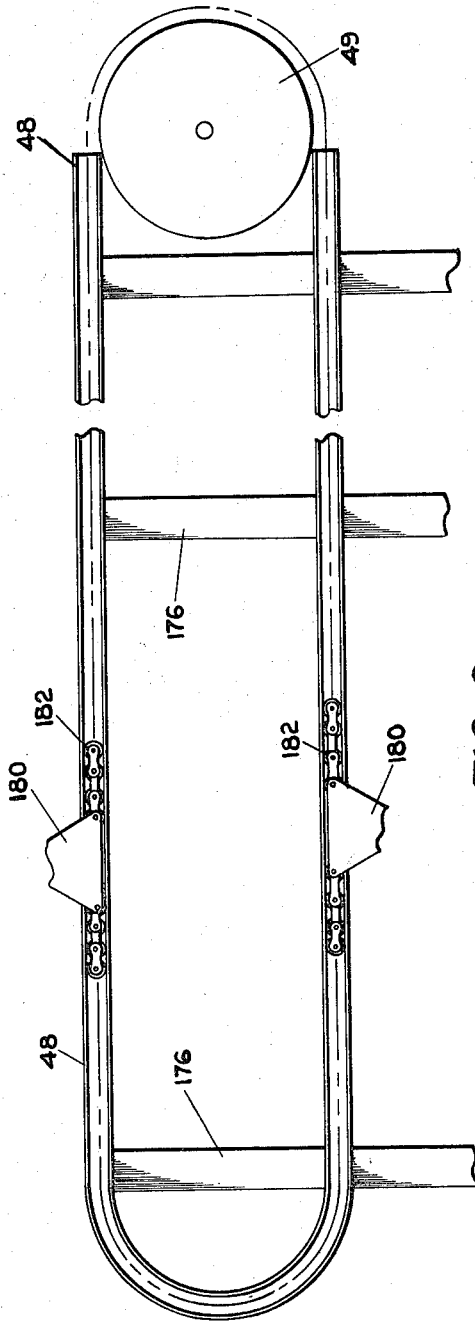
FIG. 6 is a cross sectional view through lines VI—VI of FIG. 5 illustrating the construction of the slat support follower mechanism.

As seen in FIG. 6, the track 48 is an elliptical shape and is attached at upper and lower portions to the upright supports 176. The track 48 is open at the back end. A roller 49 is fixed for rotation at the open end of the track 48 to guide a roller chain 182 between the upper and lower portions of the track 48 at the back end thereof. The roller 49 can be mounted on means (not shown) to permit movement of the roller in the direction of the extrusion press to adjust the tension on the roller chain 182. The supporting slats 44 are formed from horizontal bars 178 attached at either end to upright supports 180. The closed loop roller chain 182 is positioned within each of the tracks 48. One of the upright supports 180 is secured to each of the roller chains 182.

The supporting slats 44 are spaced along the chain so that the first slats will support the extrusion near the gripping jaws and the remainder of the slats will then follow in sequence in supporting the extrusions as the pulling head is moved from the shear press to the end of the track remote from the shear press. The slats then move with the extrusion so that marring or scratching of the extrusions is avoided.

The single fastening member 120 between the pulling head and the slat conveyor permit disengagement of the pulling head from the slat conveyor so that the slat conveyor can be independently driven. For certain materials, it may be desirable to provide slight movement between the slat conveyor and the extruded products to prevent marking of the extrusions due to differential cooling at the slat supports. This movement can be accomplished by providing a different drive for the slat supports so that the slats move at a speed slightly greater than or less than the speed of the pulling head.

Figure 9:
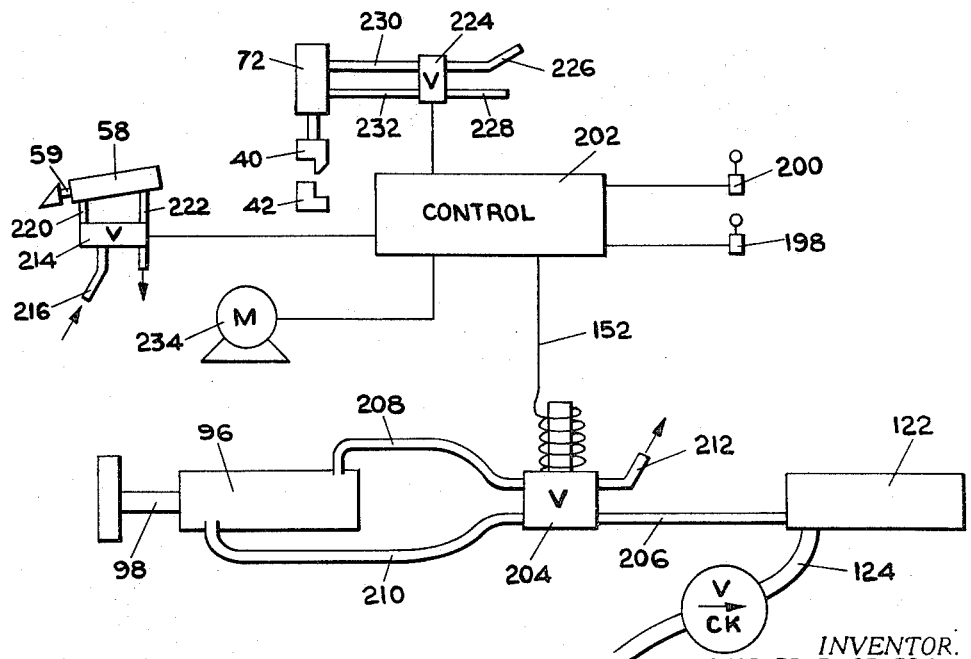
FIG. 9 is a schematic block diagram illustrating the control system used to operate the puller and shear press assembly illustrated in FIGS. 1 through 8.

The operation of the assembly will be described with reference to FIGS. 7, 8 and 9 which are more schematic representations of the apparatus described hereinbefore with reference to FIGS. 1 through 6. In FIG. 7, the pulling head 18 is shown at the end of the track remote from the extrusion press after an extruded product 16 has been pulled therefrom. The slats 44 have moved beneath the extrusion as it has been pulled away from the press and have traveled with the extrusion such slats being controlled by the movement of the pulling head 18. At the remote end of the track 24, the pulling head 18 strikes a micro switch 198 which signals the control center 202 that the pulling head 18 has reached a predetermined position along the track. The micro switch 198 is adjustable along the track so that the extrusions can be cut at any desired or convenient length. Alternatively a plurality of pressure or micro switches can be provided along the track to selectively stop the movement of the pulling head at given points along the track. The control center 202 in turn signals motor 234 to stop so that the movement of the pulling head away from the extrusion press is stopped. Motor 234 is coupled to the roller 32.

The control center 202 then signals a distributing valve 224 to open to permit fluid to pass through a pressure line 226 and into the top portion of cylinder 72 through a line 230. This pressure forces the shear blade downwardly to cut the extruded products 16 into the desired length. Simultaneously, fluid pressure is passed to the bottom of cylinder 66 to force the shear block 42 upwardly. When the extrusion has been cut, the control center 202 signals valve 224 to change the flow of fluid therethrough to permit the pressure to pass through line 232 into the bottom of cylinder 72 thereby raising the shear blade 40. At this time, the pressure in the top of the cylinder passes through line 230 and is vented or returned to a reservoir through line 228. Simultaneously, the shear block 42 is retracted by cylinder 66. During the shearing operation, the control center 202 signals a solenoid valve 204 through the line 152 to change position thereby permitting fluid to flow from the storage tank 122 through line 206 through valve 204 and into the remote end of cylinder 96 through line 210. This flow of pressure causes retraction of the piston rod 98, thereby opening the jaws 76 and 78 to free the end of the extruded product 16. At the same time, the control center 202 signals motor 234 to move the pulling head away from the shear press so that the jaws of the pulling head will clear the extrusion so that it can be lifted off the slats 44 without interference from the pulling head. The extruded product 16 can then be lifted off the slats 44 and transferred to other areas for processing.

After the removal of the cut extruded product 16 from the slats 44, the control center 202 signals motor 234 to rotate in a direction to cause the pulling head 18 to move toward the shear press. At the same time, the control center 202 signals a valve 214 to permit fluid pressure to flow through line 216 and into one end of cylinder 58 through line 222. This retracts the piston rod 59 thereby moving the cart 52 and the shear press assembly toward the extrusion press 12.

As the pulling head 18 travels toward the shear press, the slats 44 will follow the track 48 forwardly and downwardly, and will thereby be stored on the lower portion of the track 48. As the pulling head 18 reaches the shear press, it contacts an adjustable micro switch 200 which signals the control center 202 to stop the motor 234. At this point, the pulling head will be in the position illustrated in FIG. 8. It is noted that the shear press has moved toward the extrusion a sufficient distance to permit the outer crushed end of the extruded products 16 to be received within the open jaws 76 and 78. At this point, the pressure supply line 124 will dock with the pressure supply line 136 through the fitting members 130 and 142 respectively (see FIG. 2). The fluid pressure will then pass through lines 136 and 124 into the storage tank 122. The control center 202 will signal the solenoid valve 204 to change its position thereby permitting the flow of fluid pressure through lines 206 and into the near end of the cylinder 96 through line 208. At this time, fluid pressure will be exhausted from the other end of the cylinder through lines 210, valve 204 and line 212. This flow of fluid pressure into the cylinder 96 will cause the piston rod 98 to extend, thereby clamping the jaws 76 and 78 onto the end of the extruded product 16. When this is complete, the control center 202 then signals the motor 234 to commence its operation in order to move the pulling head 18 away from the extrusion press with the extruded product 16. This continues until the pulling head 18 again strikes the micro switch 198 which will stop the rearward movement of the pulling head 18. At this time, the control center 202 will signal the valve 214 to change position in order to permit fluid pressure to pass through line 216 and line 220 into the end of the cylinder 58, causing the piston rod 59 to extend and move the shear press away from the extrusion press 12. The cycle then repeats.

In the foregoing description, there has been described an improved extrusion pulling apparatus with conventional clamping jaws which close on the center line of the extrusion press, the clamping jaws being capable of accomodating one or a plurality of extrusion products, and capable of clamping onto extrusions of varying thicknesses. The extrusion machine is provided with a moving conveyor which moves up beneath the extrusion products as they are being pulled by the pulling mechanism and then moves within the extrusion in supporting relationship thereto, thereby adequately supporting the extrusions without marring or scratching the surfaces of these parts. The pulling head clamps the end of the extruded products with substantial force, yet is capable of pulling the extrusion products with a controlled force to strech the extrusions as they are extruded to produce straight, extruded products. By this apparatus, the expensive subsequent stretching operation can be completely eliminated.

The extrusion supporting elements which travel with the pulling head are vertically adjustable independent of the pulling head, so that the extrusion supports can effectively support extrusions of varying thicknesses. Further, a shear press is provided and movable with respect to the extrusion press and movable independently of the pulling head to cut the extrusions at varying distances from the extrusion press. By this structure the extrusion can be cut at a point near or at the end of the run for the metal billet, thereby minimizing scrap. Further, the shear press crushes the leading edge of the extrusions to make it easier for the pulling head jaws to accept the extrusions. The pulling jaws can be made smaller and less expensive because of the crushing job done by the shear press. Still further, the shear press provides a means for moving the shear press away from the gripping jaws after cutting of the extruded product to allow sufficient room to permit the gripping jaws to clamp onto the cut end of the extrusion without interference from the shear press elements.

The above described extrusion apparatus has a self-contained pneumatic actuating means on the pulling head cart, thereby eliminating bulky pressure hoses which must travel with the pulling head. The docking mechanism for recharging the pneumatic systems provides a simple and effective method of maintaining sufficient pressure in the pneumatic system to operate the gripping heads.

The controlled pulling force on the extrusions is provided by motor 234 which is linked to the roller 32. The motor 234 can be a variable torque motor and the desired pulling force can be set on the motor. Alternatively, the linkage between the motor 234 and the roller 32 can be by means of a magnetic clutch which can set to delivery a controlled output torque.

The invention has been described with reference to a pulling head with a single jaw which will be suitable for most purposes. The pulling head can, however, use multiple jaws for gripping of multiple extrusions from a multiple opening die. Each of the jaws can be independently suspended for slight movement with respect to one another to allow for variations in the rate at which individual extrusions are extruded from their respective die openings.

Reasonable variation and modification are possible within the scope of the foregoing disclosure, the drawings, and appended claims without departing from the spirit of the invention.

The embodiments of the invention in which an exclusive property or privilege is claimed are defined as follows:

1. An extrusion handling apparatus comprising:
   clamping means for engaging the ends of extruded products;
   means mounting said clamping means for movement between spaced points along a line;
   power means to move said clamping means between said points along said line, said power means including means to move said mounting means in at least one direction by applying a constant force thereto so as to pull extruded products from the die to a constant tension;
   support means structurally independent of said mounting means and movable along said line for supporting extruded products being pulled by said clamping means;
   means synchronizing the movement of said support means with the movement of said clamping means so that said support means moves along with said clamping means; and
   means for adjusting the height of said support means independently of said clamping means so as to accommodate extruded products of different dimension with respect to the center line of the die.

2. An extrusion handling apparatus according to claim 1 wherein said clamping means comprises a pair of jaws, said mounting means includes a guide to close said jaws on the center line of an extrusion die and for moving each of said jaws away from said center line.

3. An extrusion handling apparatus according to claim 2 further comprising a fluid pressure means carried by said mounting means for actuating movement of said jaws toward and away from said center line, said fluid pressure means including a fluid pressure tank, and means for recharging said fluid pressure tank at at least one point along said line along which said clamping means moves.

4. An extrusion handling apparatus according to claim 1 wherein said mounting means includes wheels, and a track for said wheels are provided on either side of said support means.

5. An extrusion handling apparatus according to claim 4 wherein said support means includes a track having an upper portion and lower portion, said upper portion extends along said line of clamping means movement curving downwardly at a front portion of said line, and then extends rearwardly to join said lower portion, horizontal slats extend across said line, means slidably securing said slats in said track, and means rigidly spacing said slats a predetermined distances apart.

6. An extrusion handling apparatus according to claim 5 wherein said synchronizing means includes a connection between said support means and said mounting means of said clamping means.

7. An extrusion handling apparatus according to claim 5 wherein said height adjusting means comprises first and second horizontal support members beneath said track, said second horizontal support being rigidly joined to said track and mounted for vertical movement with respect to said first horizontal support member, said first horizontal support member being beneath said second horizontal support member and mounted for horizontal movement with respect thereto, link members rotatably joined to said first and second horizontal support members that horizontal movement of said first horizontal support member causes a corresponding vertical movement of said second horizontal support member, thereby raising said support means for said extrusions, and power means for horizontally moving said first horizontal support member and for maintaining said first horizontal support member in selected horizontal positions.

8. An extrusion handling apparatus comprising:
clamping means for engaging extruded products;
means mounting said clamping means for movement between spaced points along a line;
power means to move said clamping means between said points along said line, said power means including means to move said mounting means in at least one direction by applying a constant force thereto so as to pull extruded products from a die at a constant tension;
support means movable along said line for supporting extruded products being pulled by said clamping means;
means synchronizing the the of said support means with movement of said clamping means so that said support means moves with said clamping means; and
means for activating the opening and closing of said clamping means, said actuating means including a fluid pressure actuation system carried by said mounting means; and
means for recharging said fluid pressure system at at least one point along said line.

9. An extrusion handling apparatus according to claim 8 wherein said clamping means comprises a pair of jaws, said mounting means includes means to guide said jaws to close on the center line of an extrusion die and for moving each of said jaws away from said center line.

10. An extrusion handling apparatus according to claim 8 wherein said fluid pressure actuation system includes a fluid pressure tank, a fluid pressure line leading from said tank, and a connector on the end of said fluid pressure line, said connector being rigidly fixed to said mounting means for said clamping means; and said recharging means includes a source of fluid pressure and a fitting engagable with said fluid pressure connector and operably connected to said source of fluid pressure, whereby fluid pressure is passed from said fluid pressure source to said tank when said fitting docks with said connector, said fitting being positioned at a terminal end of said line to dock and engage said actuator system connector and pass fluid pressure into said pressure tank when said mounting means reaches said terminal end of said line.

11. An extrusion handling apparatus according to claim 10 further comprising a shear press and a shear press support means at one end of said line; and wherein said fitting is fixed to said shear press support means, and said fitting docks with said connector as said clamping means engages extrusions cut by said shear press.

12. In combination with an extrusion pulling mechanism:
clamping means for engaging extruded products;
means mounting said clamping means for movement between spaced points along a line;
power means to move said clamping means from a first point along said line to a second point along said line at a constant tension to apply a constant force to extruded products as they are extruded from a die;
a shear press;
means mounting said shear press at said first point along said line of said clamping means;
power means to move said shear press away from said first point along said line; and
synchronization means to move said shear press away from said first point after severing of extruded products to permit said clamping means to grip extruded products cut by said shear press without interference from said shear press.

13. The combination of claim 12 wherein said shear press is movably mounted for movement along the direction of said line independent of said shear press power moving means, to thereby change the distances at which said extrusions are cut with respect to an extrusion die.

14. The combination of claim 12 wherein said shear press further comprises means to crush the leading end of said extruded products as said extruded products are being severed whereby the leading end of said extruded products is a predetermined height for easier reception by said clamping means.

15. In combination with an extrusion pulling apparatus having gripping jaws to receive the ends of extrusions from an extrusion die and means to move said gripping jaws away from said extrusion die at a constant tension;
means between said extrusion die and said gripping jaws to crush the leading end of said extrusions to a predetermined height to be accepted by said gripping jaws, whereby said ends of said extrusions received by said gripping jaws are no larger than said predetermined height regardless of the height of said extrusions.

* * * * *

UNITED STATES PATENT OFFICE
CERTIFICATE OF CORRECTION

Patent No. 3,668,910          Dated June 13, 1972

Inventor(s) Charles B. Gentry and Robert M. Scanlon

It is certified that error appears in the above-identified patent and that said Letters Patent are hereby corrected as shown below:

Column 8, line 11 "can set" should be --can be set--; "delivery" should be --deliver--; line 35, "to" should be --at--;

Column 9, line 28, "synchronizing the the of" should be --synchronizing the movement of--.

Signed and sealed this 20th day of March 1973.

(SEAL)
Attest:

EDWARD M. FLETCHER, JR.         ROBERT GOTTSCHALK
Attesting Officer                 Commissioner of Patents